Patented Apr. 10, 1934

1,954,517

UNITED STATES PATENT OFFICE 1,954,517

CONTACT INSECTICIDE

Euclid W. Bousquet and Wendell H. Tisdale, Wilmington, Del., assignors to E. I. du Pont de Nemours & Company, Wilmington, Del., a corporation of Delaware No Drawing. Application July 8, 1932, Serial No. 621,511

14 Claims. (Cl. 167—22)

This invention relates to insecticides and more particularly to insecticides of the type which kill insects upon being brought into contact therewith.

Many compounds and compositions of matter have been proposed for use as contact insecticides. However, none of such compounds or compositions of matter have proved to be entirely satisfactory. Some of the contact poisons are not sufficiently powerful and some require to be applied in large quantities but are not sufficiently low in cost to enable them to be used commercially. Other desirable and powerful contact poisons are either too expensive or are substantially insoluble in water and for that reason could not be readily applied and hence have not been used commercially to any extent.

An object of the present invention is to provide a method for killing insects by the use of a new contact insecticide. A further object is to provide a new contact insecticide. A still further object is to provide means whereby contact poisons, which it has heretofore been impractical to employ, may be employed successfully. Other and further objects are to provide a new composition of matter and to advance the art. Other objects will appear hereinafter.

These objects may be accomplished according to our invention which comprises a method for killing insects by contacting them with an emulsion or solution containing a small amount of beta-beta-dichlordiethyl ether, either alone or in combination with water insoluble contact poisons or insecticides which are soluble in b.b-dichlordiethyl ether.

Our invention is based upon our discovery that b.b-dichlordiethyl ether is an effective contact insecticide and further that while it is substantially insoluble in water it may be readily emulsified with water and is a solvent for many water insoluble contact poisons, such as water insoluble dithiocarbamates, thiuram sulfides, and the toxic ingredient from Derris root known as Rotenone.

In the use of b.b-dichlordiethyl ether, we preferably form a water emulsion containing a small amount of the ether. The b.b-dichlordiethyl ether, in a water emulsion, is particularly effective as a contact insecticide when employed with certain types of emulsifying and wetting agents. The amine soaps are especially suited for this purpose. The sulfonated oils are much less effective. Such an emulsion can be sprayed on plants in sufficient strength to kill aphids without injuring the plants. Its use is also suggested for the control of plant scale insects. It is also suggested that b.b-dichlordiethyl ether be employed in dips for cattle and other live stock for killing insects.

The b.b-dichlordiethyl ether is not only an effective insecticide but may also be employed as a solvent and dispersing agent in dissolving and emulsifying the toxic ingredient from Derris root and salts of dithiocarbamic acid, such as the water insoluble dithiocarbamates and thiuram sulfides. Such toxic ingredient and salts are known to be powerful contact poisons but their insolubility in water has rendered them exceedingly difficult to apply and prevented them from being widely used, commercially. However, b.b-dichlordiethyl ether is an effective solvent for these substances and being insoluble in water but emulsifiable therewith, it may be employed for bringing these substances into a water emulsion without danger of the substances being precipitated and hence renders it possible to successfully employ and apply these substances as contact poisons or insecticides.

In order to more fully illustrate the effectiveness of the compositions forming the subject matter of this invention and the mode in which such compositions may be applied, the following examples are given:

*Example 1.*—Apple leaves heavily infested with the rosy apple aphis (*Anuraphis roseus*) were sprayed with an emulsion containing 0.3% of b.b-dichlordiethyl ether and 0.2% diethyl ammonium oleate. After 24 hours, approximately 95% of the aphids were dead and no injury to the leaves was noted.

*Example 2.*—Chrysanthemum plants infested with black aphis (*Macrosiphoniella sanbroni*) were sprayed with an emulsion containing 0.5% b.b-dichlordiethyl ether and 0.2% diethyl ammonium oleate. After 24 hours, approximately 98% of the aphids were dead and the plants showed no injury due to the treatment.

*Example 3.*—Nasturtium plants infested with black aphis were sprayed with an emulsion containing 0.2% of diethyl ammonium oleate and 0.1% of a solution of equal parts of b.b-dichlordiethyl ether and tetra ethyl thiuram monosulfide. After 24 hours, approximately 98% of the aphids were dead and no injury resulted to the plant.

*Example 4.*—Potato plants infested with green aphis were sprayed with an emulsion containing 0.3% of a mixture of 1 part b.b-dichlordiethyl ether, 1 part tetra ethyl thiuram monosulfide, 2 parts tung oil and 2 parts butyl ammonium oleate. After 24 hours, approximately 90% of the aphids were dead and no injury was caused to the plants.

Example 5.—Apple leaves infested with the rosy apple aphis were sprayed with an emulsion containing 0.4% of a mixture composed of 1 part tetra methyl thiuram monosulfide, 4 parts b.b-dichlordiethyl ether and 5 parts diethyl ammonium oleate. After 24 hours, 100% of the aphids were dead. No injury was caused to the foliage by the treatment.

Example 6.—Nasturtium plants infested with black aphis were sprayed with a soap emulsion containing 0.1% of a solution composed of 10% of the toxic ingredient from Derris root and 90% b.b-dichlordiethyl ether. After 24 hours, more than 99% of the aphids were dead.

Example 7.—Common house flies were sprayed with a mixture of 10% b.b-dichlordiethyl ether in kerosene. At the end of a 4 minute period, more than 90% of the flies were paralyzed and 25% were dead in 24 hours.

Example 8.—Common house flies were sprayed with kerosene containing 2% of a b.b-dichlordiethyl ether extract of Derris root. Approximately 90% of the flies were paralyzed in 6 minutes and 90% were dead in 24 hours.

While we have disclosed certain specific compositions of matter comprising particular ingredients in specific proportions, it is to be understood that the ingredients and proportions thereof may be widely varied without departing from the spirit of our invention. Accordingly, the scope of our invention is to be limited solely by the appended claims construed as broadly as is permissible in view of the prior art.

We claim:

1. A contact insecticide which comprises a liquid containing a small amount of b.b-dichlordiethyl ether.

2. A contact insecticide which comprises a water emulsion containing a small amount of b.b-dichlordiethyl ether.

3. A contact insecticide which comprises water, an emulsifying agent consisting of an amine soap and a small amount of b.b-dichlordiethyl ether.

4. A contact insecticide which comprises a water emulsion of b.b-dichlordiethyl ether and a water insoluble insecticide soluble in the ether.

5. A contact insecticide which comprises a water emulsion of b.b-dichlordiethyl ether and an insecticide of the group consisting of water insoluble dithiocarbamates, water insoluble thiuram sulfides and the toxic ingredient of Derris root.

6. A contact insecticide which comprises a water emulsion of b.b-dichlordiethyl ether and an insecticide of the group consisting of tetraethyl thiuram monosulfide and the toxic ingredient of Derris root.

7. A contact insecticide which comprises small amounts of b.b-dichlordiethyl ether and the toxic ingredient of Derris root in a liquid medium.

8. The method of killing insects which comprises contacting the insects with a liquid containing a small amount of b.b-dichlordiethyl ether.

9. The method of killing insects which comprises contacting the insects with a water emulsion containing a small amount of b.b-dichlordiethyl ether.

10. The method of killing insects which comprises contacting the insects with a composition comprising water, an emulsifying agent consisting of an amine soap and a small amount of b.b-dichlordiethyl ether.

11. The method of killing insects which comprises contacting the insects with a water emulsion of b.b-dichlordiethyl ether and a water insoluble insecticide soluble in the ether.

12. The method of killing insects which comprises contacting the insects with a water emulsion of b.b-dichlordiethyl ether and an insecticide of the group consisting of water insoluble dithiocarbamates, water insoluble thiuram sulfides and the toxic ingredient of Derris root.

13. The method of killing insects which comprises contacting the insects with a water emulsion of b.b-dichlordiethyl ether and an insecticide of the group consisting of tetra ethyl thiuram monosulfide and the toxic ingredient of Derris root.

14. The method of killing insects which comprises contacting the insects with a liquid medium having incorporated therein small amounts of b.b-dichlordiethyl ether and the toxic ingredient of Derris root.

EUCLID W. BOUSQUET.
WENDELL H. TISDALE.